May 18, 1954 V. J. SIGODA Re. 23,831

TRIMMING ATTACHMENT FOR SEWING MACHINES

Original Filed Nov. 24, 1945 6 Sheets-Sheet 1

INVENTOR.
VICTOR V. SIGODA

BY
Strauch & Hoffman
ATTORNEYS.

TRIMMING ATTACHMENT FOR SEWING MACHINES

Original Filed Nov. 24, 1945 6 Sheets-Sheet 2

INVENTOR.
VICTOR J. SIGODA

BY Strauch & Hoffman

ATTORNEYS.

TRIMMING ATTACHMENT FOR SEWING MACHINES

Original Filed Nov. 24, 1945 6 Sheets-Sheet 3

INVENTOR.
VICTOR J. SIGODA

BY Strauch & Hoffman

ATTORNEYS.

TRIMMING ATTACHMENT FOR SEWING MACHINES

Original Filed Nov. 24, 1945 6 Sheets-Sheet 4

INVENTOR.
VICTOR J. SIGODA

BY Strauch & Hoffman

ATTORNEYS

TRIMMING ATTACHMENT FOR SEWING MACHINES

Original Filed Nov. 24, 1945 6 Sheets-Sheet 5

INVENTOR.
VICTOR J. SIGODA

BY Strauch & Hoffman

ATTORNEYS

May 18, 1954 V. J. SIGODA Re. 23,831
TRIMMING ATTACHMENT FOR SEWING MACHINES
Original Filed Nov. 24, 1945 6 Sheets-Sheet 6
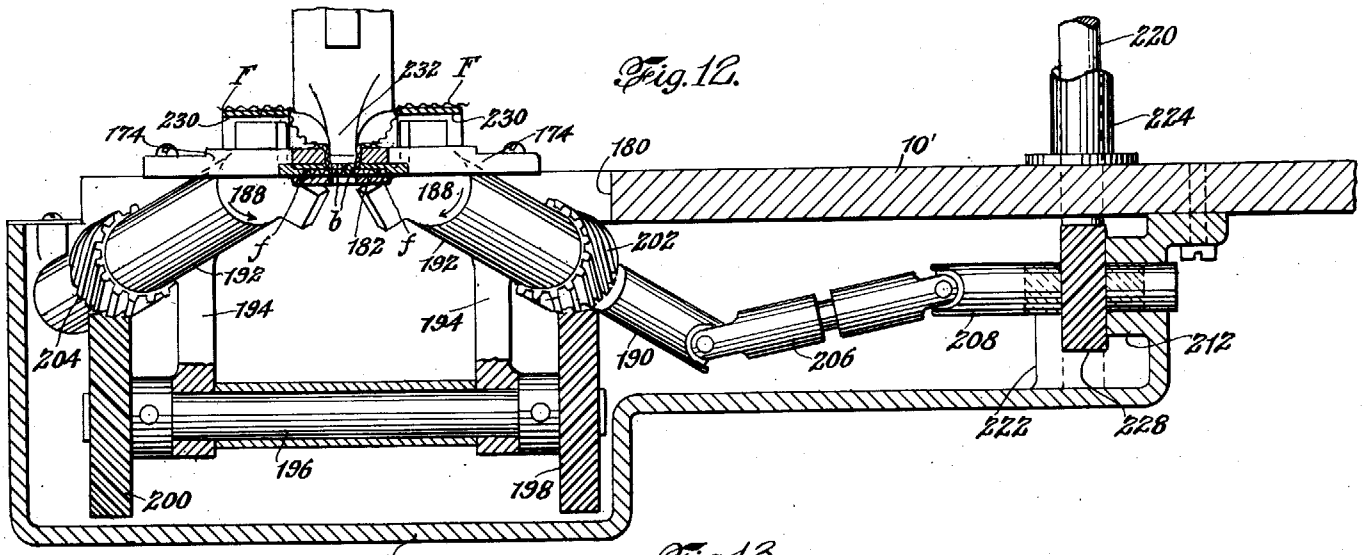
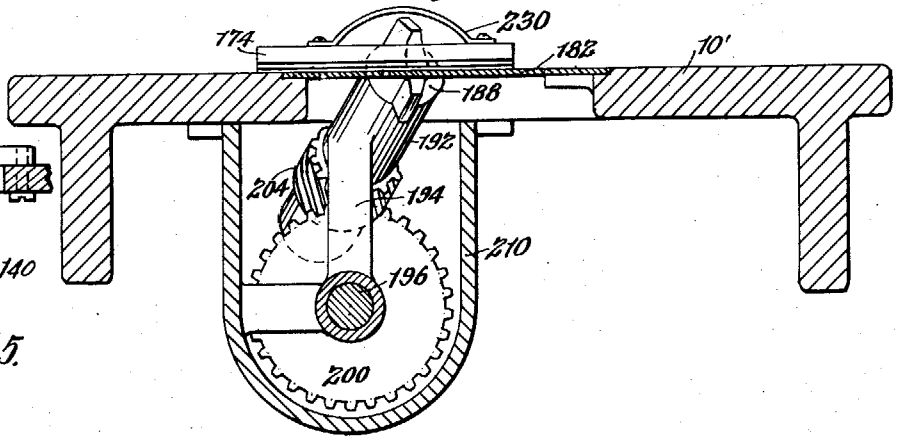
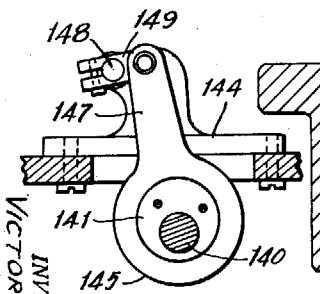
INVENTOR.
VICTOR J. SIGODA
BY Strauch & Hoffman
ATTORNEYS.

Reissued May 18, 1954 Re. 23,831

UNITED STATES PATENT OFFICE 23,831

TRIMMING ATTACHMENT FOR SEWING MACHINES

Victor J. Sigoda, Great Neck, N. Y., assignor to Man-Saw Corporation, New York, N. Y., a corporation of New York Original No. 2,540,355, dated February 6, 1951, Serial No. 630,635, November 24, 1945. Application for reissue February 4, 1953, Serial No. 335,181

29 Claims. (Cl. 164—17.5)

Matter enclosed in heavy brackets [ ] appears in the original patent but forms no part of this reissue specification; matter printed in italics indicates the additions made by reissue.

This invention relates to trimming attachments for sewing machines of that general class, in which as two sections of fabric are sewed together to form a seam in the operation of the machine, their edge portions are simultaneously trimmed or pinked.

In a modification (see Figs. 7, 8, 9) of my Patent No. 2,239,743 of April 29, 1941, a trimming device or attachment of this kind is shown in which a toothed cutter is mounted to rotate about an obliquely inclined axis with respect to a cooperating ledger blade, and in my pending application Serial No. 437,339 filed April 2, 1942, now Patent 2,420,331, granted May 13, 1947, I have shown a similar trimming or pinking device in which cutting edges of the teeth on the rotary cutter are so related to the axis of rotation and the plane of the ledger blade that the individual pinks are formed in the fabric by successively executed cuts, first from the edge of the fabric to the apex of the V-shaped notch, and then outwardly from said apex to the fabric edge. Generically considered, it is the purpose of my present invention to embody this novel method of forming the pinking cuts by means of a rotary cutter in an attachment having certain novel structural features whereby the trimming or pinking operation will be executed with greater efficiency and accuracy on the numerous different kinds of fabrics, made from either natural or synthetic materials.

One of the objects of the invention resides in the provision of such a trimming or pinking attachment, capable of application to various standard types of sewing machines, which is operated from the needle actuating shaft and mounted and arranged to afford maximum visibility and a minimum of obstruction to the feeding of the work to the stitch forming mechanism of the machine.

It is another object of the invention to provide means for operating the rotary cutter in timed relation to the needle actuating shaft whereby pinking cuts of substantially the same size will be made in the work regardless of the length of feed or the number of stitches per inch.

[Another feature of the present invention is the improved ledger blade having shearing edges raised above the plane of the blade surface and acting to apply sufficient tension to superimposed fabric edges being pinked to prevent relative movement thereof and insure exact registration of the pinking cuts.]

[An additional object of the invention is to provide improved means for tensioning the ledger blade relative to the cutter, whereby uniform pressure and wear throughout the length of the coacting shearing edges of the blade and cutter teeth is obtained.]

*A further object resides in the provision of a ledger blade having an integrally formed part thereof adapted to contact with the movable cutter to maintain an accurately assembled relation between the cutter and ledger blade and insure proper coaction of the cutter with the shearing edges of the blade to prevent excessive frictional wear of the latter and obtain a clean sharp pinking cut.*

*It is an additional object, in one specific embodiment of the invention, to provide a ledger blade for use in combination with a toothed cutter mounted for movement about a fixed axis, said blade being formed with adjacent recesses through which the cutter teeth move, to cooperate with the shearing edges of one recess, and a part between said recesses for coaxial bearing contact with the cutter.*

Still another object resides in the provision of coacting parts on the rotary cutter and ledger blade which effectively prevent the edges of the cutter teeth from over-riding the shearing edges of the ledger blade.

A further object of one embodiment of the present invention is to provide a novel method and means for joining the folded edges of two pieces of fabric in a butt seam and separately pinking said edges in a top stitching operation, in which the operator always works on the right side of the fabric to obtain better control over the finished line of stitching.

Finally it is the general aim and purpose of the present invention to provide an inexpensive pinking or trimming attachment as above characterized which comprises a comparatively small number of cooperating elements of simple and rugged structural form, whereby manufacturing costs are appreciably reduced, and which will be reliable and efficient in functional operation.

With the above and other subordinate objects in view, the invention comprises the improved trimming or pinking attachment and the construction and relative arrangement of its several parts, as will hereinafter be more fully described, illustrated in the accompanying drawings and subsequently incorporated in the subjoined claims.

In the drawings wherein I have disclosed several simple and practical embodiments of the present invention and in which similar reference characters designate corresponding parts throughout the several views:

Figure 11 is a plan view of another alternative embodiment of the invention applied to zig-zag stitching machine of the Singer 107–W or 143–W class for use in a new method of forming a thin butt seam with simultaneous pinking in a top stitching operation;

Figure 12 is a longitudinal sectional view taken substantially on the line 12—12 of Figure 11, and Figure 13 is a transverse sectional view taken substantially on the line 13—13 of Figure 11.

Fig. 15 is an end elevation taken on line 15—15 of Fig. 14.

Figure 4:
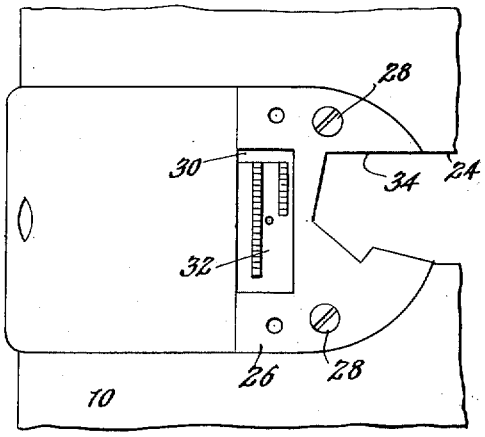
Figure 4 is a detail plan view of the adaptor throat plate of the machine.

Referring in further detail to the drawings, and for the present more particularly to Figures 1 to 7 thereof, I have shown a familiar type of sewing machine including the bed plate 10, hollow pedestal 12 and the horizontal arm 14 at the upper end thereof terminating in the needle bar guide head 16 in which the vertically reciprocating needle bar is mounted carrying the needle 18 at its lower end. The needle bar actuating shaft 20 is journalled in arm 14 and at its rear end carries the pulley 22 for connection by the usual driving belt (not shown) to a motor or other source of power. The bed 10 is provided with an opening 24 therein to accommodate parts of the invention to be presently described, and in the upper surface of said bed, the throat plate 26 is secured by means of screws 28 as seen in Figure 4. This throat plate is provided with an opening 30 to accommodate the usual four motion feed dog 32, and the inner end of the throat plate is also cut away or recessed as at 34 in registration with the opening 24 in bed plate 10.

The trimming or pinking attachment comprises a base plate 36 secured upon the bed 10 by means of screws 38. Upon this base plate the cutter carrying member 40 is adjustably mounted by means of the screws 42 threaded in the base plate and passing upwardly through the longitudinal slots 44 in opposite edge portions of the member 40. At one of its ends the member 40 is formed with a cylindrical bearing part 46 having its axis obliquely inclined transversely and vertically with respect to said member.

At opposite sides of the bearing 46, the member 40 is formed with longitudinally extending rabbets 48 receiving the opposite side edges of a ledger blade 50 mounted between the member 40 and the base plate 36. The ledger blade 50 is provided at its forward end with a nose piece 52 which may be either integral with the blade or separately formed and riveted or otherwise rigidly secured thereto as indicated at 54 in Figure 7 of the drawings. This projecting nose piece is disposed below the body portion of the ledger blade and substantially in the plane of the base plate 36 for movement within the opening 56 of the base plate.

Figure 7:
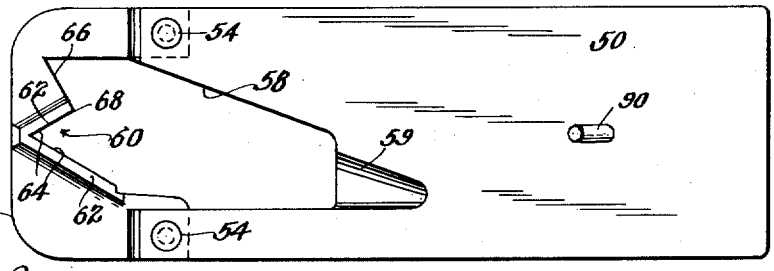
Figure 7 is a detail plan view of the ledger blade.

As seen in Figure 7 of the drawing, the forward end portion of the ledger blade 50 has an elongated longitudinally extending recess 58 therein at the rear end of which a tapering depression or cavity 59 is formed in the surface of the plate to accommodate parts of the cutter drive mechanism, as will be later described.

The nose piece 52 of the ledger blade in spaced relation from the open end of the recess 58 in the body of the blade is provided with a V-shaped notch 60 and along each side edge of this notch, said nose piece is provided with an upstanding narrow rib or land 62. The opposed inner edges 64 of the ribs provide shearing edges with which the edges of a rotary cutter to be presently described are adapted to coact. As shown in the drawings, it will be noted that one of the ribs 62 is of greater length than the other. However, this is not essential, and if desired the extension of the longer rib beyond the open side of notch 60 may be omitted. The nose piece 52 is further provided with the inclined edge 66 meeting the inner end of the shorter rib 62 at the open side of the notch 60 to form the point or apex 68, the purpose of which will be presently explained.

Figures 1, 5:
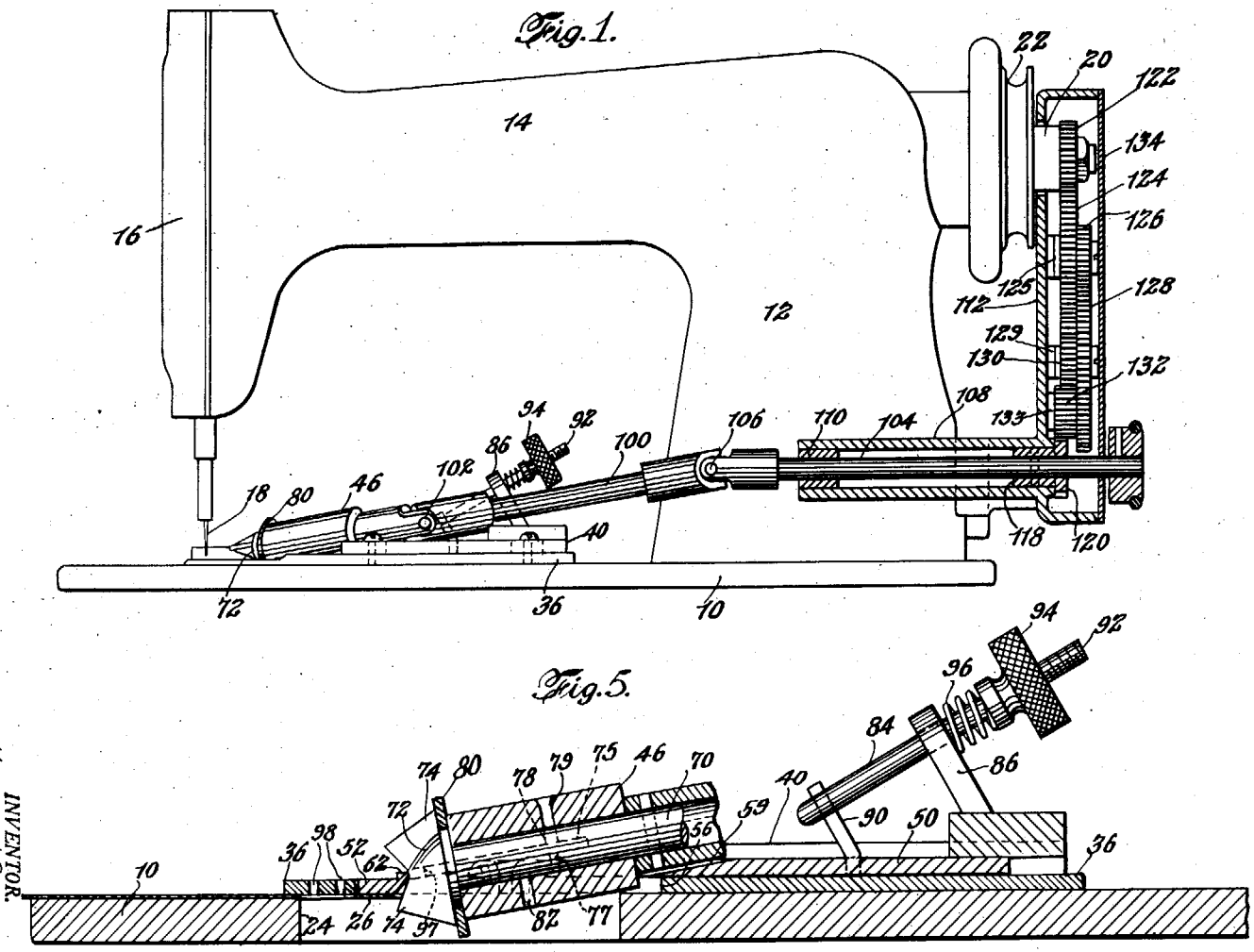
Figure 1 is a side elevation partly in section showing one embodiment of the invention as applied to a Singer sewing machine of the 95 class.
Figure 5 is a longitudinal sectional view taken substantially on the line 5—5 of Figure 2.

As seen in Figure 5 of the drawings, the forward end portion of bearing 46 extends downwardly through the recess or opening 58 in the ledger blade 50 and the opening 56 in the base plate 36. In said bearing the cutter shaft 70 is journalled and is provided at its forward lower end with the cutter head 72 having a plurality of circumferentially spaced substantially radial blades or teeth 74, each of which is formed with the cutting edges 76 and 78 respectively disposed in approximately the same angular relation to each other as the shearing edges 64 of the ledger blade 50. Preferably, a large diameter thrust washer and deflector 80 is interposed between the rear side of the cutter head 72 and the bearing 46.

The shaft 70 is formed with a central longitudinal bore 75 extending through the cutter head and radial passages 77 extending from said bore to the periphery of the shaft. The upper side of the bearing 46 is provided with one or more radial apertures 79 through which lubricant is supplied and from which it is conducted through the bore 75 and passages 77 to the lower side of the bearing. If desired this bearing may also be provided in the lower side thereof with radial opening 82 through which excess lubricant may be discharged upon the hook shaft bearing of the sewing machine mounted beneath the bed plate 10.

For the purpose of regulating the shearing pressure between the cutting edges of the teeth on the rotary cutter and the shearing edges 64 on the ledger blade, I provide means for tensioning the ledger blade and regulating its resistance to longitudinal movement under such shearing pressure. As herein shown, this blade tensioning means comprise the rod 84, axially movable through the upper end of a guide arm 86 fixed to the rear end of the member 40 and vertically inclined relative thereto. The lower forward end of this rod is provided with the eye 88 engaged over the upper end of a vertically inclined pin 90 which is suitably fixed at its lower end to the ledger blade 50. The rear end of the rod 84 is threaded as at 92 to receive the adjustable nut 94 between which and the guide 86 the coil spring 96 is interposed. The pin 90 is located in longitudinal alignment with the base or apex of the notch 60 in the ledger blade so that the shearing pressure of the edges 64 of the ledger blade against the edges 76 and 78 of the cutter head will be substantially uniform throughout the length thereof.

The forward end of the bore 75 in the cutter head 72 is closed by means of a hardened steel plug, indicated at 97 in Figure 5 of the drawings, with which the point or apex 68 on the nose 52 of the ledger blade is engaged to prevent chatter or vibration of the blade. Thus a proper normal relationship between the ledger blade and the cutter is maintained so that the edges of the cutting teeth 74 will not override the shearing edges 64 of the ledger blade.

In advance of the ledger blade the forward end of the base plate 36 is provided with transversely elongated slots, shown at 98 in Figure 5 of the drawings which register with slot 30 in the throat plate 26 to receive the upwardly projecting toothed parts of the feed dog 32.

While various means may be provided for driving the cutter shaft 70, in this embodiment of my invention, I have shown a shaft 100 flexibly connected at one of its ends to the rear end of the shaft 70 by a conventional universal joint 102, one section of which extends upwardly and rearwardly through the cavity 59 in the surface of the ledger blade 50. At its other or rear end the flexible shaft 100 is connected with the forward end of the drive shaft 104 by a similar universal joint 106. This drive shaft is supported for axial sliding movement in a bushing 110 secured in the forward end of a horizontal tubular member 108 on the side wall of a gear housing 112 which is provided at its lower end with the arm 114 rigidly bolted or secured to the sewing machine pedestal 12 as indicated at 116. In the other end of the member 108 a sleeve 118 is fixed to shaft 104 and is provided at the end thereof within the housing 112 with a small diameter gear 120.

In the upper end of the housing 112, a gear 122 is fixed to the end of the main needle actuating shaft 20 and is in constant mesh with the relatively large gear 124 journalled upon the stud shaft 125 fixed in the housing wall. This gear carries the smaller concentric gear 126 which in turn meshes with the large gear 128 journalled on the stud shaft 129 on the housing wall. Gear 128 also carries a small diameter gear 130 meshing with a similar idler gear 132 journalled on the stud shaft 133 and which is in constant mesh with the gear 120 fixed to the drive shaft 104. It will be noted from reference to Figure 1 of the drawings that gear 132 is of an appreciably greater width than gear 120. Thus when the attaching screws 42 are loosened and the member 40 and ledger blade 50 adjusted longitudinally as a unit relative to base plate 36 to position the rotary cutter relative to the line of stitching, shafts 100 and 104 are also shifted axially relative to the housing member 108 and the teeth of pinion 120 move longitudinally relative to the teeth of the gear 132.

Figure 10A:
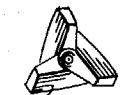
Figure 10a is an end elevation of another form of the rotary cutter.

It will be noted that the above arrangement provides a very low elevation of the parts of the attachment above the bed plate 10, the cutter shaft 70 and the flexibly connected drive shaft section 100 being disposed at an angle of approximately 10 degrees with relation to the plane of the bed plate. The housing 112 is provided with a detachable cover plate 134 so that the elements of the drive gear train may be changed to drive the shaft 104 at a desired speed ratio relative to the needle actuating shaft 20. As herein shown, the cutter shaft will make one revolution in each six revolutions of the needle actuating shaft. Thus, with a cutter having two cutting blades or teeth, one pinking cut or notch will be made in the edge of the fabric in each three rotations of the shaft 20 and hence for each three stitches. With the three toothed cutter 135 of Figure 10a, a pinking cut or notch would be produced in each two stitches.

Since the length of the intermittent feeding movements of the fabric by the feed dog 32 varies inversely with the number of stitches per inch, the distance between the pinking cuts or notches will correspondingly vary. With a fine feed (many stitches per inch) the overlapping of the pinking notches is so great that a very fine pinked edge results. As it is usually desired in the garment trade to maintain the same size of pink regardless of the number of stitches per inch and as top stitching is usually done with a large number of stitches, by providing for the change in ratio from one to two to one to three, substantially the same size pink may be maintained. Obviously, since one notch is made to every three stitches instead of two the former operation will produce a larger pink in the fabric than the latter.

By use of the long gear train to drive the cutter shaft at a selected reduced rate of speed and with said gear train at one end of the machine, the cutter shaft may be arranged closely adjacent to the bed plate, thus providing for a minimum of obstruction to the smooth movement of the work over said bed with better visibility, facilitating accurate control of the seaming operation in both top stitching and ordinary stitching.

Upon the base plate 36, a conventional type of guide member 136 is adjustably mounted. With this guide member, the edges of the superposed fabric layers are in contact, as the same are fed intermittently by the dog 32 beneath the machine presser foot, conventionally illustrated at 138 in Figure 2 of the drawing. The fabric edges are thus accurately positioned with respect to the line of stitching for movement over the front end or nose 52 of the ledger blade and the shearing edges 64 on the ribs 62 thereof. These ribs apply a certain tensional stress to the material and tend to prevent relative shifting movement of the superimposed fabric sheets. This is of material importance in operating upon silk or satin fabrics and others manufactured of synthetic materials which have a smooth or highly glossed surface as it prevents relative shifting movements between the superimposed fabric parts and insures accurate registration of the pinking cuts or notches therein.

Figure 2:
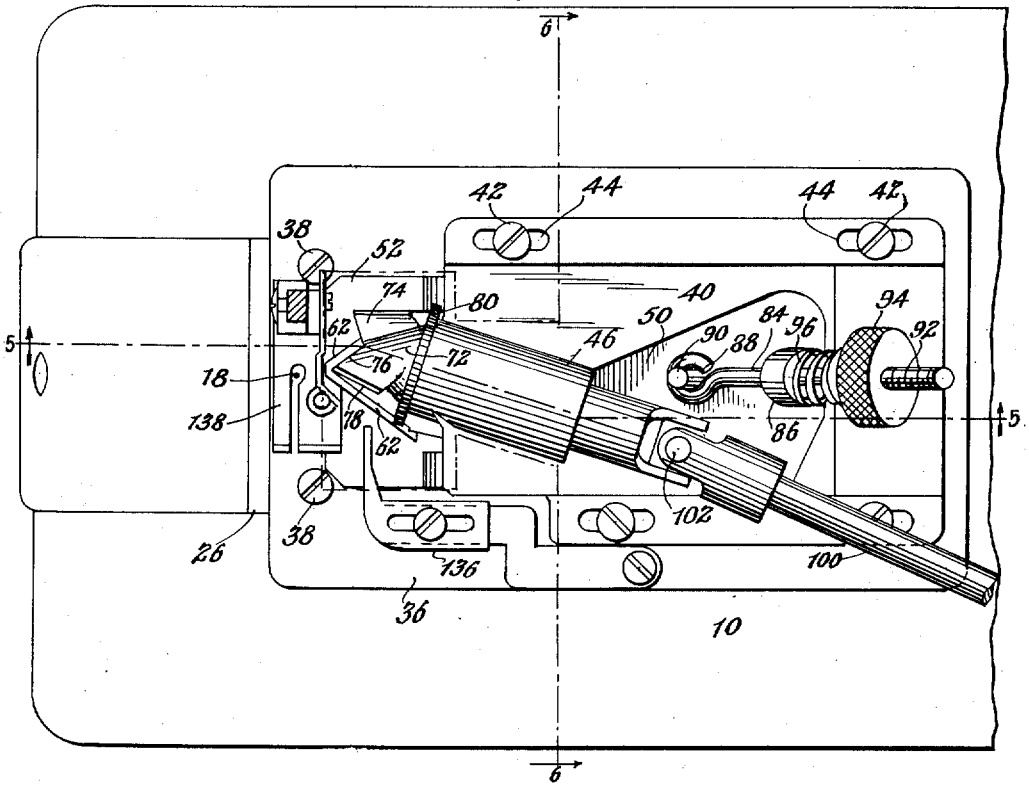
Figure 2 is a top plan view.
Figure 3:
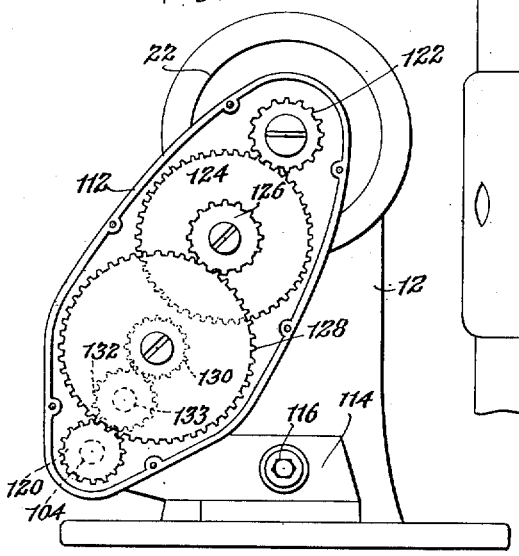
Figure 3 is an end elevation, the cover of the drive gear housing being removed.
Figure 6:
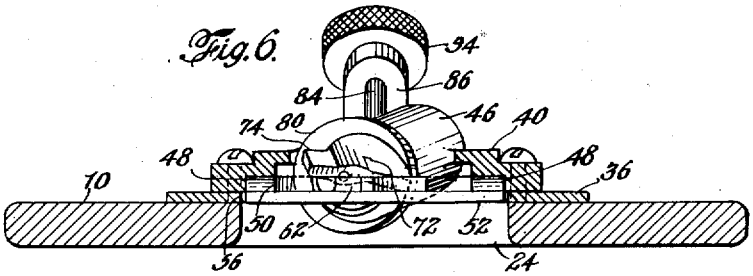
Figure 6 is a transverse sectional view taken substantially on the line 6—6 of Figure 2.

Referring now to Figures 2 and 6 of the drawings, it will be seen that as the cutter head 72 is rotated by the drive mechanism above described in a clockwise direction, the cutting edge 76 of the tooth 74 will first coact with the shearing edge 64 on the short rib 62 at one side of notch 60 in the ledger blade and progressively cut the material on a diagonal line from its extreme edge to a point inwardly spaced therefrom. After this cut is completed, the other edge 78 of the cutter tooth 74 then coacts with the shearing edge 64 on the other rib 62 to progressively cut the material outwardly from the apex of the notch 60 on a diagonal line through the edge thereof, thereby excising a V-shaped part from the edge of the material and completing a single pinking cut. In the cooperative shearing action of the cutter teeth and ledger blade, the latter yields slightly against the tension of the spring 96 and by properly adjusting the resistance of this spring to such movement, a sharp clean shearing cut may be obtained in the operation of the device upon various fabric materials which may differ widely in their structural characteristics. It has been found that by the use of this particular method of forming the individual pinking cuts, originally disclosed in the pending application above referred to, greater uniformity in the size and shape of the pinking cuts is obtained than is possible by any other method.

Figure 8:
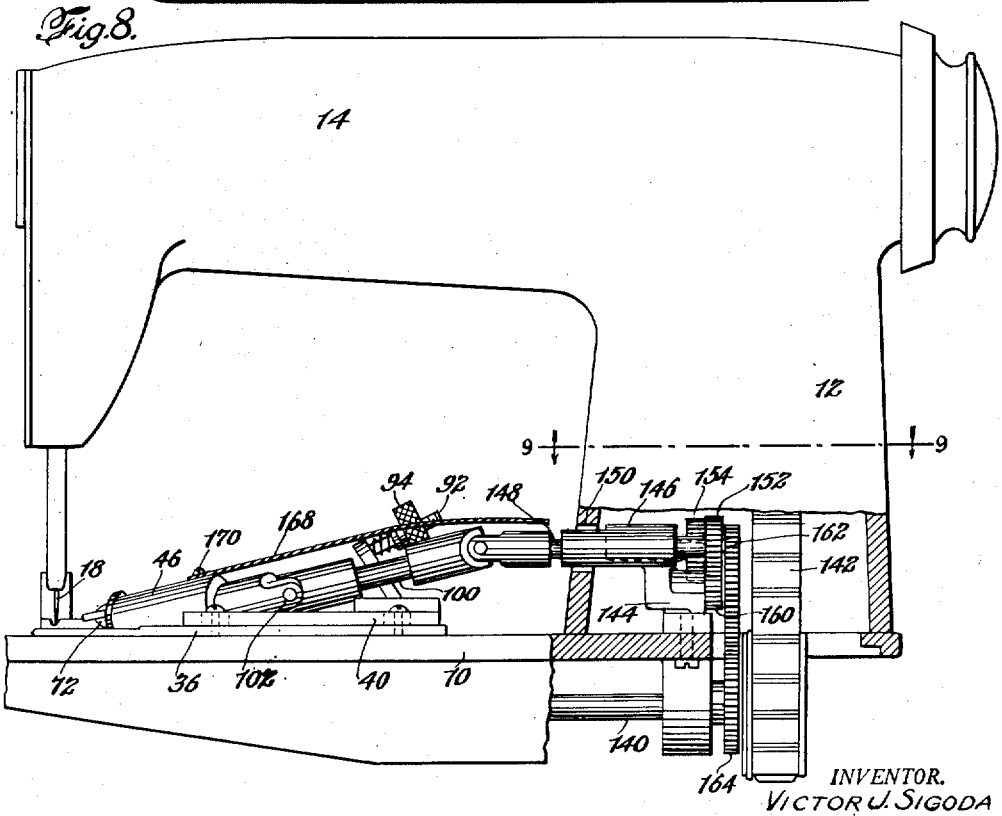
Figure 8 is a side elevation partly in section illustrating a slightly modified embodiment of the invention applied to a sewing machine of the Singer 400–W class.
Figure 9:
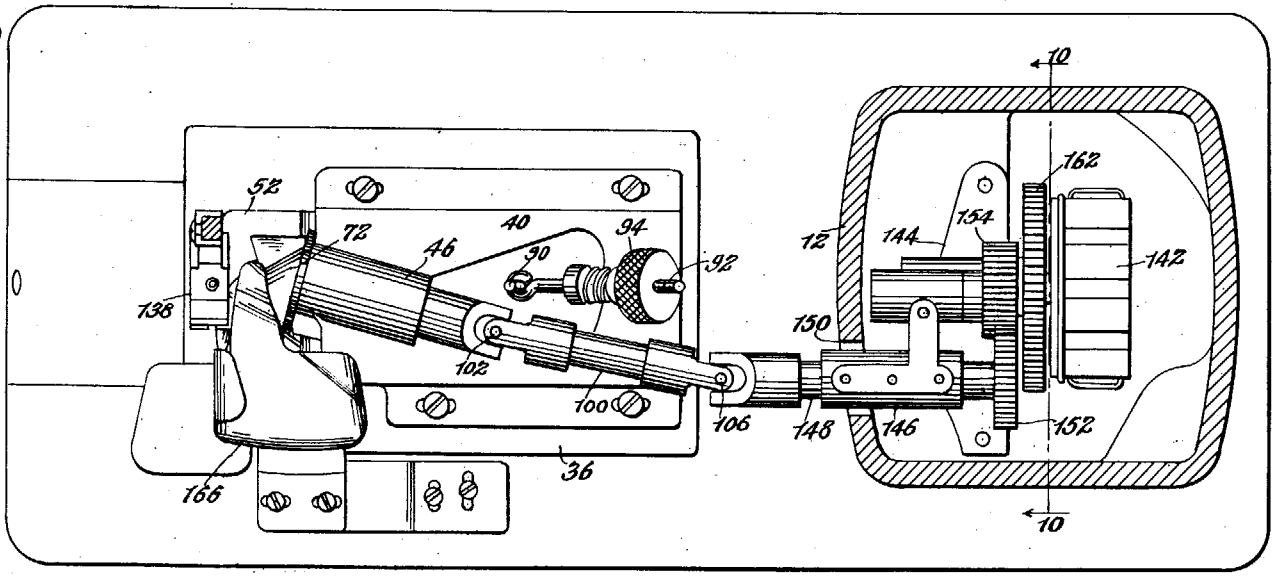
Figure 9 is a horizontal sectional view taken substantially on the line 9—9 of Figure 8.
Figure 10:
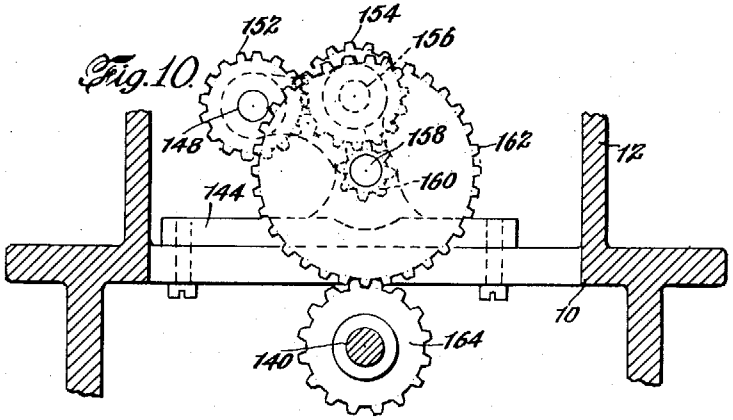
Figure 10 is a fragmentary vertical section taken substantially on the line 10—10 of Figure 9.

In Figures 8 to 10 of the drawings I have shown another embodiment of the invention applied to a Singer sewing machine of the 400 W class. In this machine, the needle actuating shaft in the arm 14 is connected with the hook shaft 140, mounted beneath bed 10 of the machine, by means of the drive belt 142. The pinking attachment mounted on the machine bed is substantially the same as that heretofore described but the drive gear train and housing therefor externally of the hollow pedestal 12 of the machine is dispensed with, and the pinking cutter shaft is driven from the shaft 140. Thus within the lower end of the pedestal 12 a bracket member 144 is securely fixed upon the bed 10 of the machine. This bracket is formed at its upper end with an elongated bearing 146 for the pinker drive shaft 148 and extends through an opening 150 in the wall of the pedestal. To the end of said drive shaft within the pedestal, gear 152 is fixed and in mesh with a relatively wide gear 154 journalled on a stud shaft 156 fixed in said bracket. Below the gear 154 a shaft 158 is journalled in the bracket and carries a pinion 160, in mesh with the gear 154, and the relatively large gear 162 which is in constant mesh with the gear 164 fixed on the end of the shaft 140 adjacent the drive belt 142.

Figure 14:
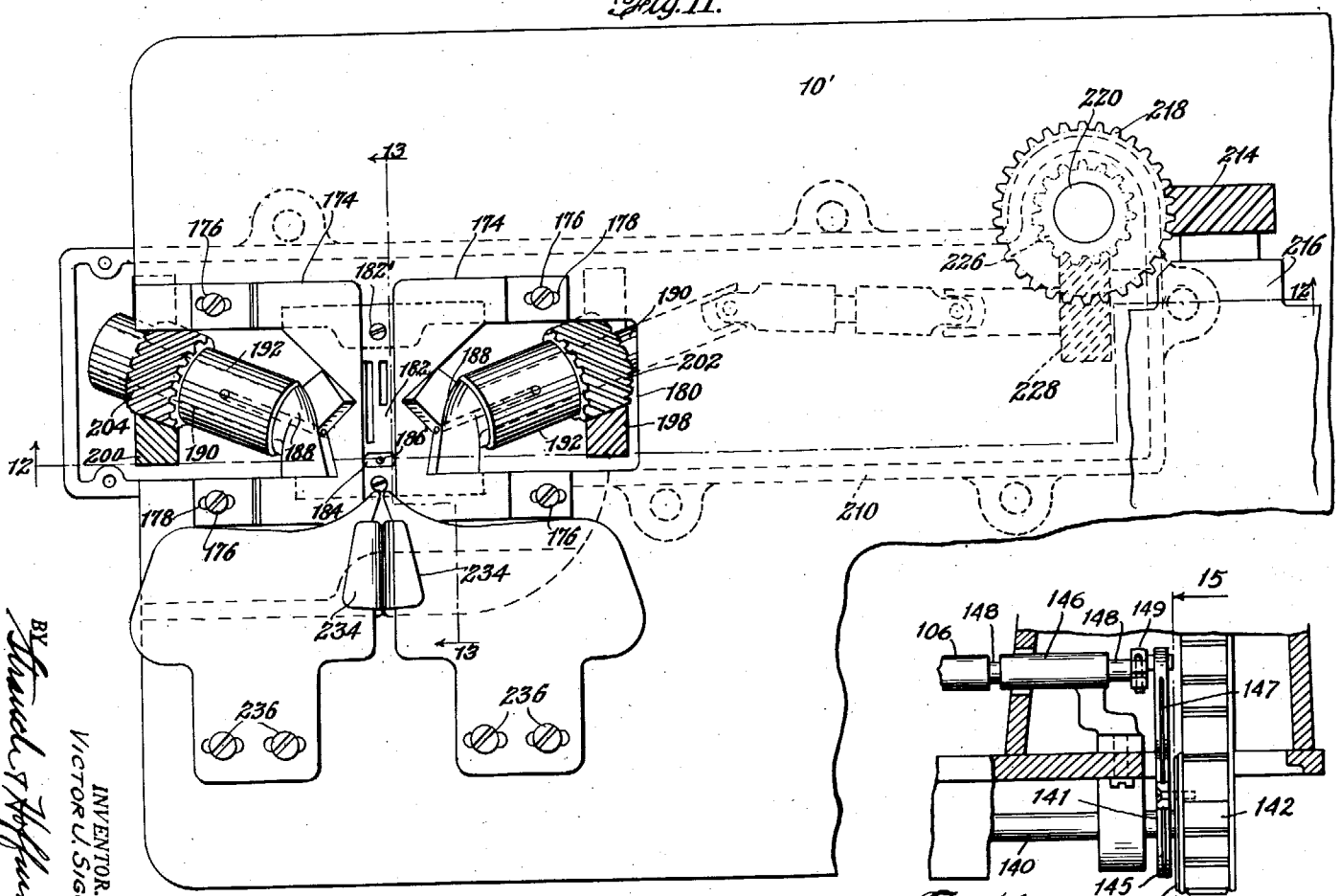
Fig. 14 is a side elevation corresponding to a fragmentary portion of Fig. 8, showing a modification in the drive means which provides for oscillating operation of the movable cutter.

If desired, a single-toothed pinking cutter may be employed, and mounted, as shown in Fig. 5, for oscillation about an axis inclined to the horizontal. One form of drive therefor is shown in Figs. 14 and 15. This form or any equivalent may be substituted for the rotary drive means shown in Figs. 1 and 8 to transmit an oscillatory motion to cutter shaft 70 in timed relation with the feeding movement of the fabric over the ledger blade. Thus, during each period of rest of the fabric, the single-toothed cutter will be rotated in one direction downwardly through the notch in the ledger blade to form a pinking cut in the material, and then, the direction of rotation will be reversed to raise the pinking tooth above the plane of the ledger blade so that the edge of the fabric may then be fed past the cutter tooth without interference. These oscillatory motions of a single-toothed cutter would produce a succession of pinking cuts in the edge of the fabric in its intermittent feeding movement over the surface of the ledger blade.

Such an oscillating drive, as used with a trimming attachment of this type applied to a Singer sewing machine of the 400 W class, (described above with reference to Figs. 8 to 10 of the drawings), could consist of an eccentric 141 fixed by screws to belt sprocket 143 which is secured to hookshaft 140, said eccentric being peripherally circumscribed by strap 145 on one end of pitman 147, which, in turn, is pivotally connected at its other end to crank arm 149 suitably clamped on shaft 148 which drives the movable cutter through the universal joints. As hookshaft 140 rotates, eccentric 141 and pitman 147 transmit a rocking or oscillating motion to pinker drive shaft 148, and hence in turn to cutter head 72.

As seen in Figure 9 of the drawings, a conventional type of folder 166 may be mounted on the machine bed in advance of the presser foot of the machine to fold the edge portion of one fabric piece upon another as they are moved beneath the presser foot to the feeding mechanism. This folder may be similar to that shown in Patent No. 2,239,743. I also preferably provide a cover plate 168 extending over the driving connections between shaft 148 and the shaft of the rotatable cutter head and suitably supported, as for example at 170 on the bearing 46, or elsewhere, as required. Of course, any suitable cover plate may also be provided for the attachment as shown in Figure 1 of the drawings. It is obvious that the provision of such a cover plate will greatly facilitate the free and easy passage of material over the attachment and prevent entanglement of the same with the driving connections for the cutter shaft.

In Figures 11, 12 and 13 of the drawings, I have illustrated an embodiment of my invention particularly designed for top stitching, and in which the cutter blades or teeth of the rotary cutter head move upwardly through the ledger blade instead of downwardly as in the constructions previously described. This construction is particularly useful in making what is known as a butt seam which is employed where a very thin seam connection between the two fabric pieces is desired. By cutting upwardly from beneath the fabric the oppositely projecting single edges of the fabric pieces are separately though simultaneously pinked. This top stitch butt seaming operation is preferably performed on a Singer zig-zag machine of the 107 W or the 143 W type.

Multiple pinking mechanism for separately pinking the individual edge portions of a fabric seam is disclosed in my Patent No. 2,172,570, issued September 12, 1939. However in this patented construction, ledger blades are not employed and the material is forceably held by means of pressure rollers in contact with horizontally rotating toothed pinking members. In my present invention, by reason of the novel form of rotary cutting member and my new method of making the individual pinking cuts in the fabric, I am enabled to dispense with the use of such pressure rollers and to provide an arrangement whereby a butt seam of acceptable and sufficient strength may be formed in thin materials and the individual edge portions thereof separately pinked while the abutting folds are securely connected by a zig-zag line of stitching. To this end, I have provided the two ledger blades 174 which are of substantially the same structural form as the part 52 of the ledger blade 50 heretofore described. These blades are adjustably mounted upon the machine bed 10′ by means of the screws 176 disposed through slots 178 in the opposite side arms of said ledger blades and threaded in the bed 10′. The intermediate portions of the ledger blades having the shearing edges extend across the opening 180 in the machine bed and are spaced above the throat plate 182 also extending transversely across said opening and suitably mounted or secured at its opposite ends in the top surface of the bed 10′ as by means of the screws indicated at 182′. This throat plate is provided with the usual slots for the toothed portions of the feed dog and also with the elongated opening 184 in which the vertically reciprocating and laterally movable needle 186 of the zig-zag stitch forming mechanism operates.

The toothed rotary cutter members 188 which coact with the shearing edges of the respective ledger blades 174 are of substantially the same construction as heretofore described and the cutter shafts 190 extend through the opening 180 of the bed 10′ at a vertical and transverse inclination with respect to the plane thereof and are journalled in bearings 192 integrally formed with the upper ends of spaced parts 194 within a housing 210. In the lower ends of these spaced parts 194 a shaft 196 is journalled and to the ends thereof the spiral gears 198 and 200 respectively, having reversely angled teeth are suitably fixed. The gear 198 is in mesh with the spiral gear 202 on one of the cutter shafts 190 while the gear 200 is in mesh with a similar gear 204 on the other of the said cutter shafts. The cutter shaft provided with the gear 202 is connected by the universally jointed shaft section 206 with the drive shaft 208. This drive shaft is journalled in a suitable bearing 212 on one end wall of the housing 210 which is bolted or otherwise secured to the underside of the bed 10′ and completely encloses the two cutter shafts and the operating mechanism therefor.

While any suitable means may be provided for operating the shaft 208 from the main shaft of the machine in the present instance, for this purpose I have shown a spiral gear 214 fixed to the end of the transverse shaft mounted in the hollow pedestal 216 of the machine and driven by means of suitable connecting gearing at a predetermined speed ratio with respect to the main needle actuating shaft. This gear is in mesh with a similar gear 218 fixed upon the vertical shaft 220 journalled at its lower end in a bearing 222 within the housing 210 and extending upwardly through the machine bed 10′ and the vertically disposed tubular standard 224 suitably fixed thereto. Within the housing 210 a spiral gear 226 is fixed to the shaft 220 and has meshing engagement with the gear 228 secured to shaft 208.

As shown in Figures 12 and 13 of the drawings I preferably provide a curved guard member 230 on each of the ledger blades 174 extending over the respective pinking members 188 and serving to support the work out of contact with the cutter teeth above the surface of the ledger blade. Also as seen in Figure 12 of the drawings, a special form of presser foot 232 cooperates with a throat plate 182 between the spaced ledger blades and the feed dog to guide and direct the work in its intermittent movements during the sewing or stitching operation.

In Figure 11 of the drawings I have illustrated two folders 234 of conventional form adjustably mounted by means of the screws 236 upon the surface of the machine bed 10′ and from the above description it will be apparent that as the pieces of fabric are fed between the ledger blades 174 and the throat plate 182, a fold is formed in the edge portion of each piece of fabric F with the fold bights b in substantial abutting contact with each other as seen in Figure 12 of the drawings, while the free edge portions f of said folds extend laterally in opposite directions and beneath the shearing edges of the respective ledger blades 174. The two pieces of fabric material extend upwardly from the folds at opposite sides of the presser foot 232 and laterally over the guard members 230. In the progressive feeding movement of the two pieces of fabric, the fold bights b thereof will be securely connected in a tight thin seam by a zig-zag line of stitching.

In the stitching operation, the individual edge portions f of the seam are pinked by the respective rotary pinking members 188. As indicated by the arrows in Figure 12 of the drawings, the member 188 at the inner side of the line of stitching is rotated in a clockwise direction at the required predetermined speed while the member 188 at the outerside of the line of stitching is rotated in a counterclockwise direction. Thus the cutting teeth of these members below the ledger blades will move upwardly and rearwardly from a vertical plane tangent to the axis of the respective members and the respective cutting edges of said teeth as they move above the plane of the ledger blade will successively coact with the complementary shearing edges of the blade to form an individual pinking cut or notch in the seam edge f, in the manner above described. The upward cutting action through the individual horizontally disposed seam edges is a true top-stitching operation, the operator always working on the right side of the material and having better control of the finished line of stitching, which is the main object or purpose of this particular method of operation. Of course it will be understood that a single rotary cutter might be mounted as in Figure 12 for under cutting cooperation with a single ledger blade as in Figures 1 to 7 for the pinking of one or a number of superimposed plies of fabric material.

From the foregoing description and the accompanying drawings, the construction, manner of operation and several advantages of the illustrated embodiments of the invention will be readily understood. It will be apparent that by reason of the very low elevation of the rotary cutter and its operating mechanism above the plane of the machine bed plate greater visibility of the work is afforded with a free and unobstructed rearward movement thereof in the progressive stitching or sewing operation. It will be seen that the rotary cutter and the ledger blade may be readily adjusted laterally on the base plate 36 of the attachment for any desired width of seam edge. The thrust washer plate 80 is of sufficient diameter to prevent undesired contact of the cutting teeth with the material and to efficiently serve as a deflector, tending to direct waste and lint transversely and rearwardly of the cutter so that it will not move laterally and collect upon the surface of the ledger blade and the driving connections with the cutter operating shaft. This deflector also prevents the winding of excess material about the knift shaft or being caught between the shaft bearing and the end of the knife. The raised shearing edges 64 of the ledger blade by holding the material taut and under tension provide a greatly improved and sharper cutting action and materially reduces the frequency of resharpening these shearing edges. Also this construction enables such materials as satin or silk having slippery surfaces which tend to slide over each other to be satisfactorily pinked. By placing the superimposed fabric layers under tension at the point of cut, the pinking notches will be cut in both layers of fabric in accurate alignment with each other. Normally, the presser foot and the top surface of the ledger blade would act together in resisting the free passage of the fabric material. By providing the shearing edges on the raised ribs 62, the top surface of the ledger blade in contact with the material under the presser foot is greatly reduced, thus minimizing resistance to the movement of the material over the ledger blade in the intermittent feeding movement thereof to the stitching mechanism. Further, this feature of my invention enables the shearing edges to be sharpened with a minimum of manual labor as it is only necessary to dress the top edges of the ribs 62 instead of the entire surface of the ledger blade.

In addition to the above, it will further be seen that the present invention provides simple and effective means for maintaining the shearing edges of the ledger blade in proper relation to the coacting cutting edges of the rotary cutter member together with means for easily and quickly regulating the tension of the ledger blade as may be required in accordance with the structural characteristics of the particular material being operated upon. The changeable driving gear ratios for varying the number of pinking cuts per inch of stitching is also an important practical feature of the invention.

In general, the present invention provides a pinking attachment of this kind which is readily applicable to various standard types of sewing machines and is capable of high speed factory production of pinked fabrics, particularly for the purpose of producing an accurately trimmed or pinked seam edge simultaneously with the stitching operation, with the assurance of uniformly high quality with a minimum of waste. As the attachment comprises a minimum number of mechanical elements of very simple structural form, initial production cost is reduced to a minimum while maintenance expense will be reasonably low.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

*1* [18]. In combination with a sewing machine, mechanism for decoratively cutting sheet material, comprising a ledger blade and a coacting rotatable cutting member movable about a fixed axis, said axis being disposed transversely to the path of feed of the material and in intersecting relation to the ledger blade, said ledger blade having means for bearing contact with said cutting member substantially at the axis of rotation thereof to maintain a predetermined cooperative cutting relation between said blade and said cutting member.

*2* [1]. The combination defined in claim *1* [18], in which the ledger blade is horizontally disposed and is provided with two shearing edges, and in which the rotatable cutter is mounted above the ledger blade in intersecting relation to the plane thereof, and in which the rotatable cutter has at least two cutting edges angularly related to each other to respectively coact at different times with the complementary shearing edges of the ledger blade in the movement of the rotatable cutter in one direction.

*3* [2]. The combination defined in claim *1* [18], together with operating means for said rotatable cutting member including a gear train driven from the main shaft of the machine for actuating said member at a selected reduced speed ratio relative to the stitch forming mechanism.

*4* [3]. The combination defined in claim *1* [18], in which the ledger blade and the cutting member are mounted and arranged for relative bodily movement with respect to each other, together with means yieldingly resisting such relative movement and maintaining a normal contacting relationship between said blade and said member.

*5* [4]. The combination defined in claim *1* [18], together with an operating shaft for said cutting member mounted with its axis disposed at a vertical inclination of approximately ten degrees with respect to the plane of said blade.

*6* [5]. In combination with a sewing machine having a main shaft and stitch forming mechanism operated thereby, mechanism for decoratively cutting sheet material supported by the machine bed at one side of said stitch forming mechanism comprising a ledger blade, a coacting rotatable cutting member movable about a fixed axis, said axis being disposed transversely to the path of feed of the material and in intersecting relation with the ledger blade, said ledger blade having means for bearing contact with said cutting member substantially at the axis of rotation thereof to maintain a predetermined cooperative cutting relation between said blade and said cutting member, speed reduction gearing driven from the main shaft, and a plurality of universally jointed drive shaft sections operatively connecting said gearing with the cutting member.

*7* [6]. The combination defined in claim *6* [5], in which said drive shaft sections are disposed at a vertical inclination of approximately ten degrees to the plane of the machine bed, together with a relatively fixed work guide member extending over said shaft sections.

*8* [7]. In mechanism for decoratively cutting sheet material for sewing machines, a stitch forming mechanism, a base plate on the machine bed, a ledger blade laterally spaced from the line of feed of the work to the stitch forming mechanism of the machine, a guide member for the ledger blade, a rotatable cutting member mounted on said guide member to move about a fixed axis, said axis being disposed transversely to the path of feed of the work and in intersecting relation with the ledger blade, said ledger blade having means for bearing contact with said cutting member substantially at the axis of rotation thereof to maintain a predetermined cooperative cutting relation between said blade and said cutting member, adjustable means mounted on the guide member and connected to the ledger blade to variably resist movement of the blade relative to the base plate and cutting member, and means for laterally adjusting said guide member and ledger blade as a unit on the base plate with respect to the line of stitching.

*9* [8]. Mechanism as defined in claim *8* [7], having an operating shaft for the cutting member journalled in a bearing on said guide member, and wherein a combined thrust and deflecting washer is interposed between one end of the bearing and said cutting member.

*10* [9]. Mechanism as defined in claim *8* [7], in which said ledger blade is provided with shearing edges formed upon narrow upstanding ribs on the top surface of the ledger blade to apply tension to the work between said shearing edges.

*11* [10]. Mechanism as defined in claim *8* [7], in which an operating shaft for said cutting member is journalled in a bearing on one end of said guide member, and said adjustable means comprises a tension regulating device mounted on the other end of said guide member and connected to the ledger blade to yieldingly resist movement of said blade relative to the cutting member in the operation thereof.

*12* [11]. In mechanism for decoratively cutting sheet material for sewing machines, a base plate on the machine bed, a ledger blade having a part disposed in the plane of the base plate and provided with a V-shaped pinking notch having divergent shearing edges, a guide member for the ledger blade, a rotatable cutting member mounted on said guide member to move about a fixed axis, said axis being disposed transversely to the path of feed of the work and in intersecting relation with the ledger blade, said rotatable member having at least two cutting edges respectively coacting with complementary shearing edges of the ledger blade, said ledger blade having means for bearing contact with said cutting member substantially at the axis of rotation thereof to maintain a predetermined cooperative cutting relation between said blade and said cutting member, and tensioning means for said blade mounted on the guide member and operatively connected with said blade at a point in longitudinal alignment with the apex of the notch to apply uniformly constant pressure to said shearing edges of the blade throughout their length and yieldingly resist movement of said blade relative to the cutting member.

*13* [12]. In combination with a sewing machine having stitch forming mechanism, a bed and a throat plate mounted thereon, mechanism for decoratively cutting sheet material comprising a ledger blade mounted on the machine bed at one side of the throat plate and having divergent shearing edges, a coacting rotatable cutting member movable about a fixed axis, said axis being disposed transversely to the path of feed of the material and in intersecting relation to the ledger blade, said ledger blade having means for bearing contact with said cutting member substantially at the axis of rotation thereof to maintain a predetermined cooperative cutting relation between said blade and said cutting member, said rotatable cutting member having an operating shaft mounted below the machine bed and provided with at least two cutting edges angularly related to each other and to the axis of said shaft to respectively coact at different times with the complementary shearing edges of the ledger blade in the upward movement of said cutting edges about said axis, and means for actuating said shaft and pinking member in timed relation with the stitch forming mechanism of the machine.

*14* [13]. The combination defined in claim *13* [12], in which said cutting member is provided with a plurality of radially disposed teeth each having two cutting edges to coact with the shearing edges of the ledger blade.

*15* [14]. The combination defined in claim *13* [12], in which the axis of said rotary cutting member is disposed at a vertically oblique angle relative to the plane of the ledger blade.

*16* [15]. The combination defined in claim *13* [12], in which the sewing machine is of the zigzag type, and is provided with two laterally spaced apart ledger blades mounted on said bed above the throat plate adapted to receive between them the folds of two pieces of fabric with the fold bights in abutting relation and the fabric edges extending laterally in opposite directions beneath the respective ledger blades, each of said ledger blades having divergent shearing edges, a rotatable cutting member associated with each ledger blade operatively mounted beneath the bed plate of the machine and in intersecting relation to the plane of the ledger blade, each of said cutting members having at least two angularly related cutting edges coacting respectively with the complementary shearing edges of the associated ledger blade in the upward movement of said cutting edges to simultaneously pink the opposite edge portions of the fabric seam, and means for actuating said cutting members.

*17* [16]. The combination defined in claim *16* [15], in which each cutting member is provided with a plurality of radially disposed teeth each having two cutting edges to coact with the shearing edges of the respective ledger blades.

*18* [17]. In combination with a sewing machine having stitch forming mechanism, apparatus for decoratively cutting sheet material, said apparatus being mounted at one side of the path of feed of the work to the stitch-forming mechanism, comprising a ledger blade, a coacting oscillatably rotatable cutting member movable about a fixed axis, said axis being disposed transversely to the path of feed of the material and in intersecting relation to the ledger blade, said ledger blade having means for bearing contact with said cutting member substantially at the axis of rotation thereof to maintain a predetermined cooperative cutting relation between said blade and said cutting member, together with means to rotate said cutting member about its axis not more than 360 degrees in one direction and then to rotate said cutting member in a reverse direction an equal amount.

19. In combination with a sewing machine having stitch forming mechanism, a pinking attachment mounted at one side of the path of feed of the work to the stitch forming mechanism, comprising a longitudinally disposed ledger blade, a single-toothed pinking member mounted for rotary movement about an axis inclined to said ledger blade and disposed transversely to the path of feed of the work, said ledger blade having means for bearing contact with said pinking member substantially at the axis of rotation thereof, and means for oscillating said pinking member about said axis to form a pinking cut during each interval of rest of the work, comprising an eccentric, a pitman oscillated thereby, and a crank arm pivotally attached thereto and connected to oscillate said pinking member.

20. In pinking mechanism, a base plate, a ledger blade rectilinearly movable on the base plate in substantially parallel relation therewith, a rotary cutting member, means for mounting said member on the base plate for rotation in fixed intersecting relation with the ledger blade, said member having at least two cutting edges and said ledger blade having complementary cutting edges for shearing coaction therewith, said blade being further provided with a part exerting thrust bearing pressure on the cutting member in substantially parallel relation to the rotative axis thereof, and means yieldingly urging said ledger blade to its normal position relative to the cutting member and base plate and maintaining yielding shearing pressure of the cutting edges of said blade with the cutting edges of said member in the rotary movement of the latter.

21. The pinking mechanism as defined in claim 20, wherein the axis of said rotary cutting member is vertically inclined relative to the plane of the ledger blade.

22. The pinking mechanism as defined in claim 20, wherein the axis of said rotary cutting member is transversely and vertically inclined relative to the plane of the ledger blade.

23. In pinking mechanism, a blade plate, a ledger blade, a member secured to the base plate slidably guiding the ledger blade in a parallel path relative to the base plate, said member having a bearing at one end axialy inclined longitudinally of said member, a rotary cutting member having a shaft journalled in said bearing and supporting said cutting member for rotation in transverse intersecting relation with the ledger blade, said cutting member having at least two cutting edges and said ledger blade having complementary cutting edges for shearing coaction therewith, and means mounted on the opposite end of said guiding member operatively connected to the ledger blade to urge the same in one direction and maintain a yielding shearing pressure of the cutting edges of said blade with the cutting edges of said cutting member in the rotary movement of the latter.

24. In fabric trimming mechanism, a ledger blade movable in a horizontal plane, a cutting member and means mounting said member for rotation about an axis disposed longitudinally of the blade and in fixed intersecting relation to the ledger blade, said member and blade having coacting cutting edges, and adjustable means operatively connected to the ledger blade to yieldingly urge said blade into substantially constant bearing contact with the cutting member at its axis of rotation and maintain a predetermined resistance to shearing pressure of the cutting edge of the blade with the cutting edge of said cutting member in the rotation of the latter.

25. In fabric trimming mechanism, a ledger blade disposed substantially in a horizontal plane, a cutting member, means mounting said member for movement about an axis intersecting the plane of said blade, said blade and member having coacting cutting edges, and means for yieldably maintaining a substantially constant thrust pressure contact between the ledger blade and cutting member in an angular direction relative to the path of movement of the cutting member with respect to the ledger blade, to establish a normal predetermined cooperative relationship between the cutting edges of said member and blade.

26. The fabric trimming mechanism as defined in claim 25, wherein said thrust pressure is exerted in a direction substantially parallel to said axis.

*27. A ledger blade for fabric pinking devices having directly adjoining, substantially V-shaped notches, the junction of said notches being provided with a part raised above the plane of the blade to form a bearing apex on the blade between said notches for engagement with a toothed cutter rotatable about a fixed axis disposed transversely to and in intersecting rotation to said ledger blade, at least one of said notches being defined by shearing edges adapted to cooperate with the cutting edges of the rotatable cutter tooth.*

*28. A ledger blade for fabric pinking devices having adjoining notches, at least one of said notches being defined by shearing edges, one of said shearing edges being provided with a bearing apex at the junction of said notches consisting of a portion raised above the top surface of the blade.*

*29. A ledger blade for fabric pinking devices having adjoining notches, at least one of said notches being defined by shearing edges, and a raised bearing apex disposed between the adjoining notches, said apex being formed of pyramidally disposed faces, one face being parallel to the top surface of said blade and the other intersecting faces being angularly offset from said surface.*

References Cited in the file of this patent or the original patent

UNITED STATES PATENTS

| Number | Name | Date |
|---|---|---|
| 1,579,577 | Thompson | Apr. 6, 1926 |
| 1,849,443 | Wheeler et al. | Mar. 15, 1932 |
| 1,870,819 | Maag et al. | Aug. 9, 1932 |
| 1,886,422 | Popper | Nov. 8, 1932 |
| 1,944,580 | Sigoda (I) | Jan. 23, 1934 |
| 2,034,354 | Popper | Mar. 17, 1936 |
| 2,093,071 | Brussell | Sept. 14, 1937 |
| 2,142,079 | Weis | Dec. 27, 1938 |
| 2,172,570 | Sigoda | Sept. 12, 1939 |
| 2,177,854 | Antonelli | Oct. 31, 1939 |
| 2,182,911 | Bowman | Dec. 12, 1939 |
| 2,239,743 | Sigoda | Apr. 29, 1941 |
| 2,297,372 | Stevenson | Sept. 29, 1942 |
| 2,301,229 | Sigoda | Nov. 10, 1942 |